(12) United States Patent
Lindley et al.

(10) Patent No.: US 9,641,534 B2
(45) Date of Patent: May 2, 2017

(54) PROVIDING CONTROLLED ACCESS TO ADMIN CREDENTIALS DURING A MIGRATION

(71) Applicant: Dell Software, Inc., Round Rock, TX (US)

(72) Inventors: Chad Lindley, Mt. Horeb, WI (US); Tom Willis, Madison, WI (US)

(73) Assignee: Dell Software, Inc., Round Rock, TX (US)

( * ) Notice: Subject to any disclaimer, the term of this patent is extended or adjusted under 35 U.S.C. 154(b) by 144 days.

(21) Appl. No.: 14/845,050

(22) Filed: Sep. 3, 2015

(65) Prior Publication Data

US 2017/0070505 A1    Mar. 9, 2017

(51) Int. Cl.
*H04L 29/06* (2006.01)
*G06F 15/16* (2006.01)

(52) U.S. Cl.
CPC .............. *H04L 63/10* (2013.01); *H04L 63/06* (2013.01)

(58) Field of Classification Search
None
See application file for complete search history.

(56) References Cited

U.S. PATENT DOCUMENTS

| | | | |
|---|---|---|---|
| 2004/0199609 A1* | 10/2004 | Papatla | H04L 29/06 709/220 |
| 2015/0244716 A1* | 8/2015 | Potlapally | H04L 63/064 713/155 |
| 2016/0099998 A1* | 4/2016 | Richman | H04L 67/1095 709/202 |
| 2016/0308812 A1* | 10/2016 | Johnstone | H04L 51/22 |

* cited by examiner

*Primary Examiner* — Fatoumata Traore
(74) *Attorney, Agent, or Firm* — Brian Tucker; Kirton McConkie

(57) ABSTRACT

Access to admin credentials can be controlled during a migration. By controlling access to the admin credentials, a consultant can be allowed to perform migration tasks without the consultant being exposed to the administrative-level access necessary to perform such tasks. Accordingly, an organization can maintain complete control and visibility over the entire migration process, including how and when the admin credentials are used, while still being able to employ outside individuals or even inside individuals with reduced security or clearance levels in the process.

18 Claims, 8 Drawing Sheets

PROVIDING CONTROLLED ACCESS TO ADMIN CREDENTIALS DURING A MIGRATION

CROSS-REFERENCE TO RELATED APPLICATIONS

N/A

BACKGROUND

Migration refers to a process of transferring content such as emails from a source system to a target system. For example, an email migration may be performed to transfer email from a mailbox in a source system to a corresponding mailbox in a target system. An email migration may be performed for various reasons including when a company switches over to a new email service provider, switches to a different platform (e.g., traditional vs. hosted), is acquired, etc.

FIG. 1 illustrates an example computing environment 100 in which a migration engine 101 is interposed between a source system 102 and a target system 103 for the purposes of performing a migration. Generally speaking, migration engine 101 reads content on source system 102 and writes the content to target system 103.

Migrations are not a frequent activity for most IT personnel, and therefore, organizations do not typically have the expertise or personnel to properly manage the entire migration process. As a result, many migrations include some level of outsourcing either to assist with migration preparation or in managing and monitoring migrations throughout the migration process. For example, an organization may hire consultants to assist in configuring migration engine 101 to properly access source system 102 and target system 103.

In these instances, organizations must supply the consultants with credentials for accounts with elevated permissions within their source and target systems (i.e., "admin credentials"). The consultant would typically use the admin credentials to configure migration engine 101 to properly access source system 102 and target system 103 to perform various migration tasks. However, with the admin credentials, the consultant could also improperly access the source or target systems.

For example, FIG. 2 represents various ways in which a consultant 150 may employ admin credentials 110 to access source system 102 and admin credentials 111 to access target system 103 some of which may be unauthorized. As shown, consultant 150 may employ a computing device 104 to establish a connection (e.g., an SSH or RDP connection) directly with source system 102 or target system 103 or to configure migration engine 101 to establish a connection with source system 102 or target system 103.

The particular manner in which a consultant could access source system 102 or target system 103 is not important to the invention. However, what is important is that, with these admin credentials, the consultants will have access to critical resources and sensitive data within source system 102 and target system 103. In other words, the admin credentials will give the outside consultants the same or even higher levels of access than many of the organization's inside IT personnel. Organizations may therefore be reluctant to hire consultants during a migration or may even be reluctant to perform a migration.

BRIEF SUMMARY

The present invention extends to methods, systems, and computer program products for providing controlled access to admin credentials during a migration. The present invention can allow a consultant to perform migration tasks without the consultant being exposed to the administrative-level access necessary to perform such tasks. Accordingly, by employing the present invention, an organization can maintain complete control and visibility over the entire migration process, including how and when the admin credentials are used, while still being able to employ outside individuals or even inside individuals with reduced security or clearance levels in the process.

In one embodiment, the present invention is implemented as a method for providing controlled access to admin credentials during the migration. The method can be performed by a migration engine that is interposed between a source system and a target system to perform a migration of content from the source system to the target system. A first request is received from a consultant which requests first admin credentials that are required by the migration engine to perform one or more migration tasks on either the source system or the target system. In response, a request is sent to a first administrator to submit the first admin credentials. The first admin credentials are then received from the first administrator and stored in an identity database. Upon performing the one or more migration tasks, the identity database is accessed to retrieve the first admin credentials. The first admin credentials are then employed to perform the one or more migration tasks.

In another embodiment, the present invention is implemented as one or more computer storage media storing computer executable instructions which when executed perform a method for providing controlled access to admin credentials during a migration. One or more interfaces, which are displayed to a consultant, are configured to receive configuration settings for configuring the migration engine to perform one or more migration tasks on one or both of a source system and a target system. The consultant provides a first request via the one or more interfaces for admin credentials corresponding to the source system. In response to the first request, a request to submit the admin credentials corresponding to the source system is sent to an administrator. The consultant provides a second request via the one or more interfaces for admin credentials corresponding to the target system. In response to the second request, a request to submit the admin credentials corresponding to the target system is sent to the administrator. The admin credentials corresponding to the source system and the admin credentials corresponding to the target system are then received from the administrator and stored in an identity database. The admin credentials corresponding to the source system are stored in association with an identifier of the source system and the admin credentials corresponding to the target system are stored in association with an identifier of the target system. Upon performing a first migration task of the one or more migration tasks that requires accessing either or both the source or target systems, the corresponding admin credentials are retrieved from the identity database. The corresponding admin credentials are then employed to perform the first migration task.

In another embodiment, the present invention is implemented as a migration system that includes a migration engine configured to be interposed between a source system and a target system to perform a migration of content from the source system to the target system, and an identity database for storing first admin credentials corresponding to the source system and second admin credentials corresponding to the target system. The migration engine is configured to receive input from a consultant that configures the migration engine to perform one or more migration tasks during the migration of content from the source system to the target system. At least one of the one or more migration tasks requires one or both of the first admin credentials or the second admin credentials. The migration engine is further configured to receive one or more requests from the consultant for the first admin credentials and the second admin credentials, and in response, send one or more requests to one or more administrators for the first admin credentials and the second admin credentials. Upon receiving the first and second admin credentials, the migration engine stores the first and second admin credentials in the identity database for subsequent retrieval when performing the at least one of the one or more migration tasks thereby enabling the migration engine to perform the at least one of the one or more migration tasks without receiving the first or second admin credentials from the consultant.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, a consultant should be construed as any individual that is involved in performing migration tasks that require admin credentials but does not know or should not know the admin credentials. A migration should be construed as a process of transferring content from locations/accounts on a source system to corresponding locations/accounts on a target system. In typical cases, a migration is performed on email systems to migrate email and associated content (e.g., contacts, calendar items, tasks, etc.). However, a migration can also be employed on other systems such as file systems, bulletin board systems, content management systems (e.g., SharePoint), or collaboration systems (e.g., Yammer, Jive, Chatter, IBM Connect, Atlassian Confluence, etc.). The present invention could be employed when a migration is performed on any type of system and for any content type.

Also, in this specification, configuration settings should be construed generally as referring to any configurable option or parameter of a migration engine. A migration engine may typically be configured to perform a number of migration tasks once configuration settings have been provided that customize the migration tasks for the particular environment. Therefore, a configuration setting can include an identifier or address of a source system or of a target system, any ports to use to connect to the source or target systems, a protocol to use to transfer content, a location of content on the source system that is to be migrated, a location on the target system where the content is to be migrated, connection information for accessing the source or target systems, any admin credentials necessary to perform migration tasks, etc.

To address the security risks of divulging admin credentials to a consultant during a migration, the present invention provides a migration system that allows the consultant to use the admin credentials to access the source and/or target systems without actually receiving or knowing the admin credentials. In other words, the migration system of the present invention can allow the consultant to configure a migration engine to perform migration tasks requiring admin credentials without the admin credentials being divulged to the consultant.

Figure 1:
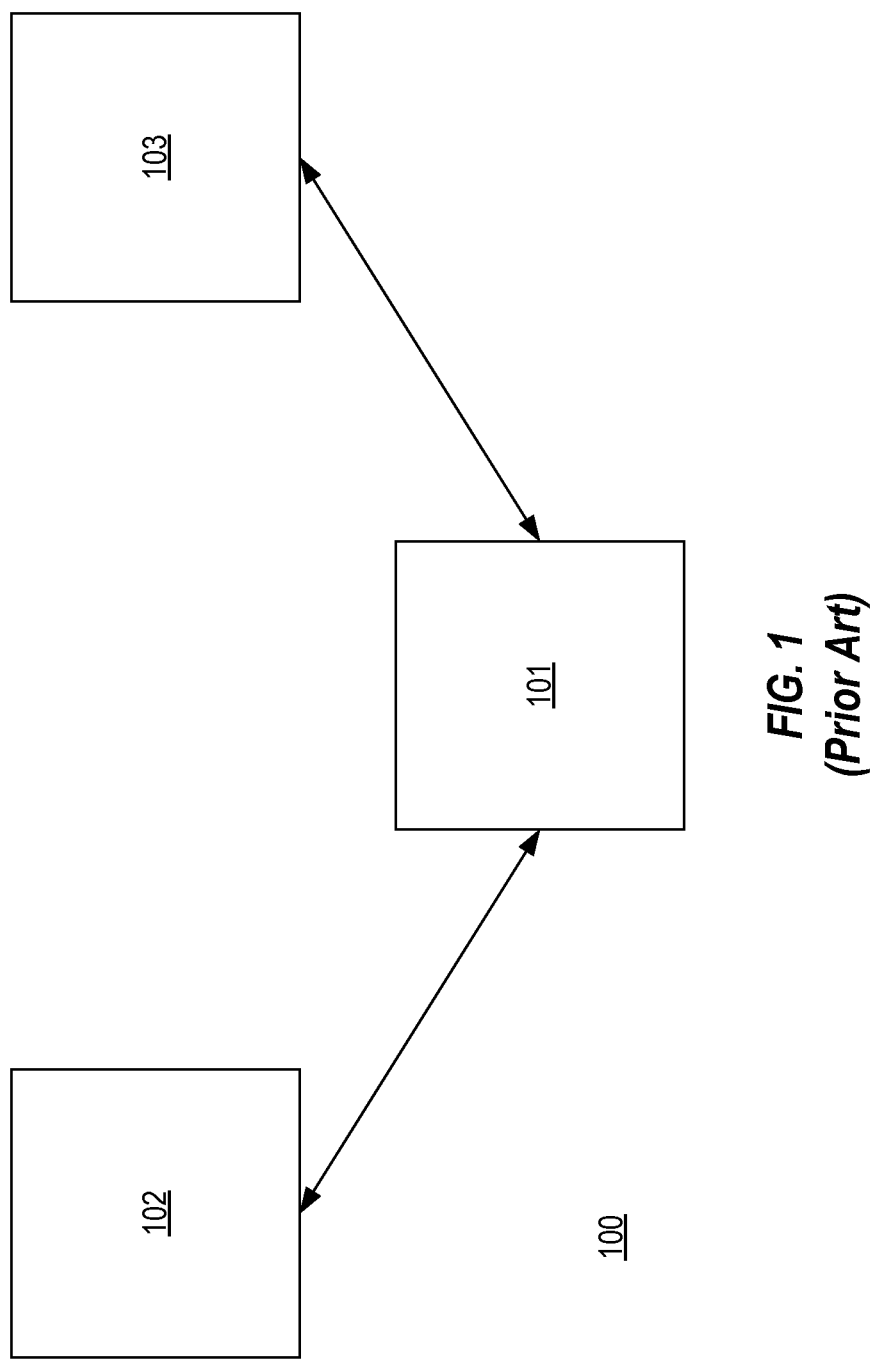
FIG. 1 illustrates an example computing environment in which a migration engine may be employed to perform a migration from a source system to a target system.
Figure 2:
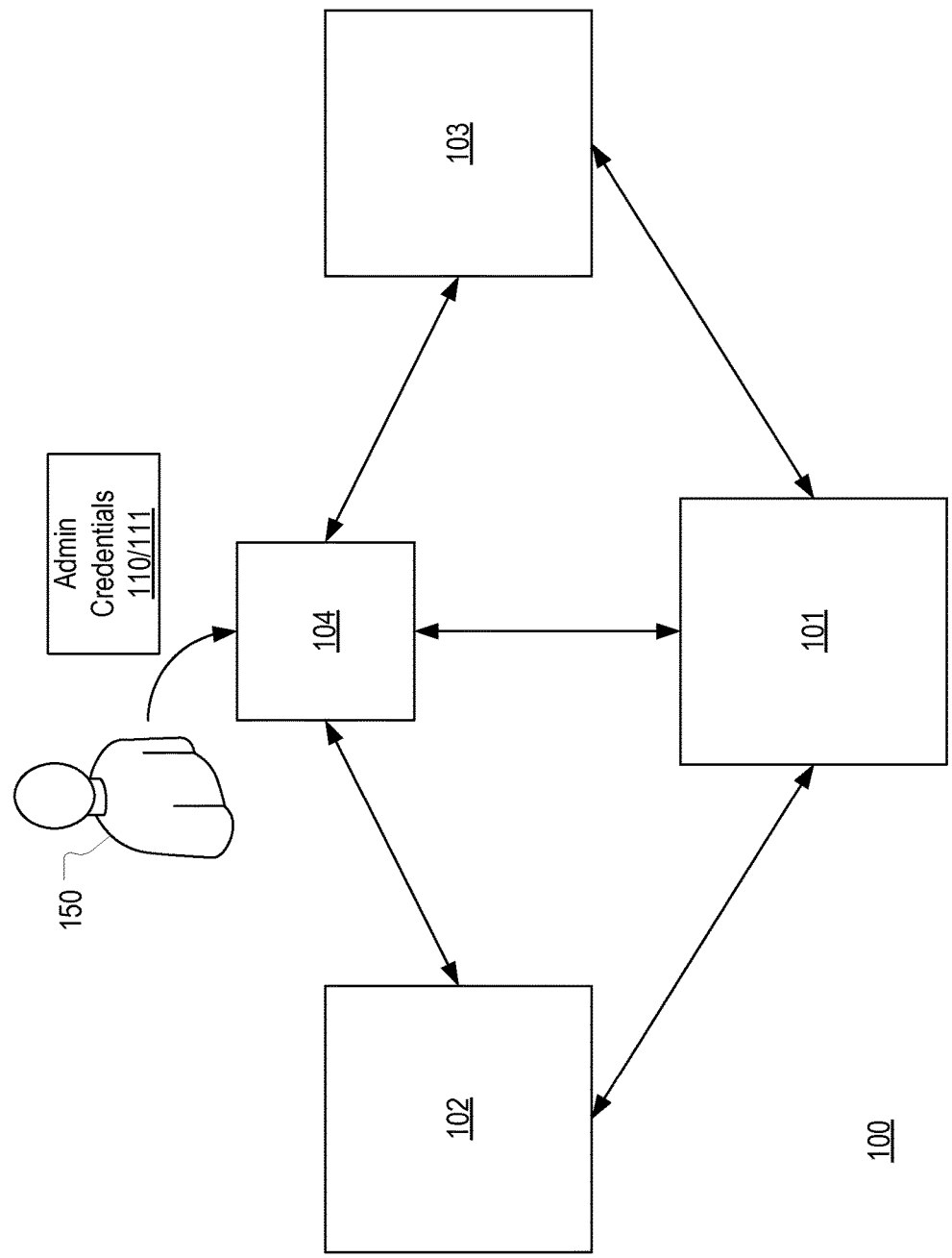
FIG. 2 illustrates various ways in which a consultant, who is given admin credentials for the source and/or target system, can access the source and/or target system with elevated permissions.
Figure 3:
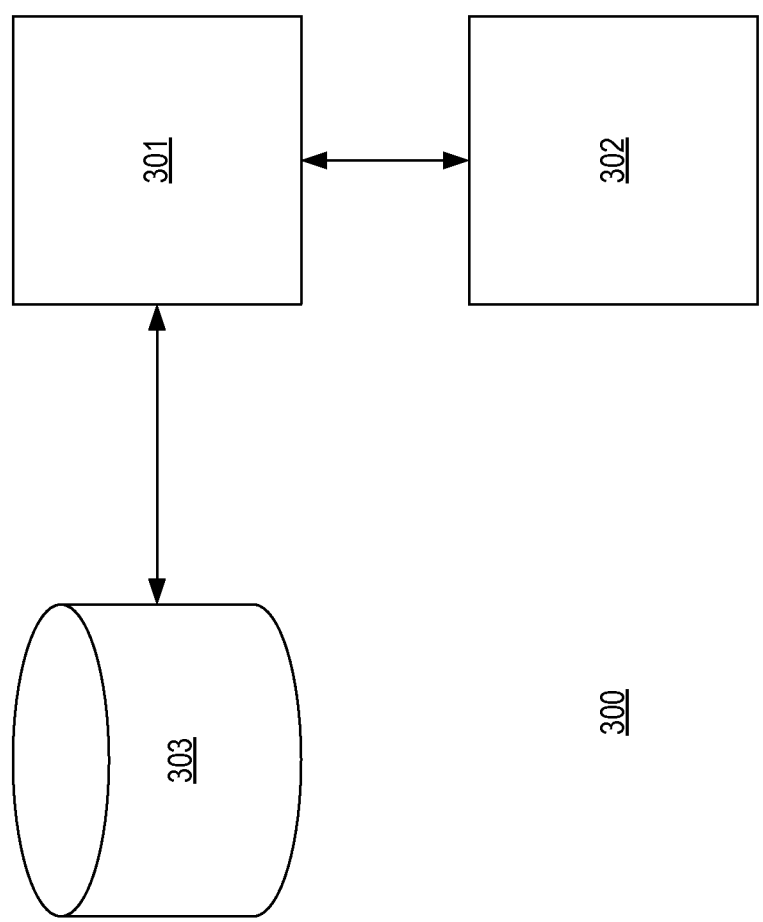
FIG. 3 illustrates a migration system that is configured in accordance with one more embodiments of the present invention.

FIG. 3 illustrates an example of a migration system 300 that is configured in accordance with one or more embodiments of the present invention. Migration system 300 includes a migration engine 301 that is configured to be interposed between a source system and a target system to perform a migration of content from the source system to the target system.

Migration system 300 also includes a web console 302 that can function as an intermediary between migration engine 301 and a consultant and between migration engine 301 and IT personnel (hereinafter "administrators"). Although web console 302 is depicted as being separate from migration engine 301, in some embodiments, web console 302 (or the functionality that it performs) can be incorporated into migration engine 301. Web console 302 generally functions as an interface (e.g., a web-based interface) for receiving requests for admin credentials from a consultant and for receiving such admin credentials from an administrator. Web console 302 can also function as an interface by which a consultant and/or an administrator can configure migration engine 301 to perform a migration. For example, web console 302 can represent a server that provides a web-based interface for interacting with migration engine 301.

Migration system 300 further includes an identity database 303 that is coupled to migration engine 301. Identity database 303 functions as a repository for storing encrypted admin credentials to be used by migration engine 301 during a migration. In particular, migration engine 301 can be configured to access identity database 303 to obtain and decrypt the appropriate admin credentials when the migration engine needs to access the source system or the target system to perform a task during a migration. As an example, to perform a migration, migration engine 301 may need to be configured to connect to and login to the source system using the admin credentials. The migration engine 301 may also need to provide the admin credentials to access other resources (e.g., a directory structure) of the source system. Identity database 303 can store the encrypted admin credentials until migration engine 301 needs to employ them to perform such tasks. Similarly, migration engine 301 can be configured to automatically access the appropriate admin credentials within identity database 303 when a task is to be performed. In this way, a consultant will not need to manually input the admin credentials to configure migration engine 301, and therefore, there is no need to divulge the admin credentials to the consultant.

Figure 4:
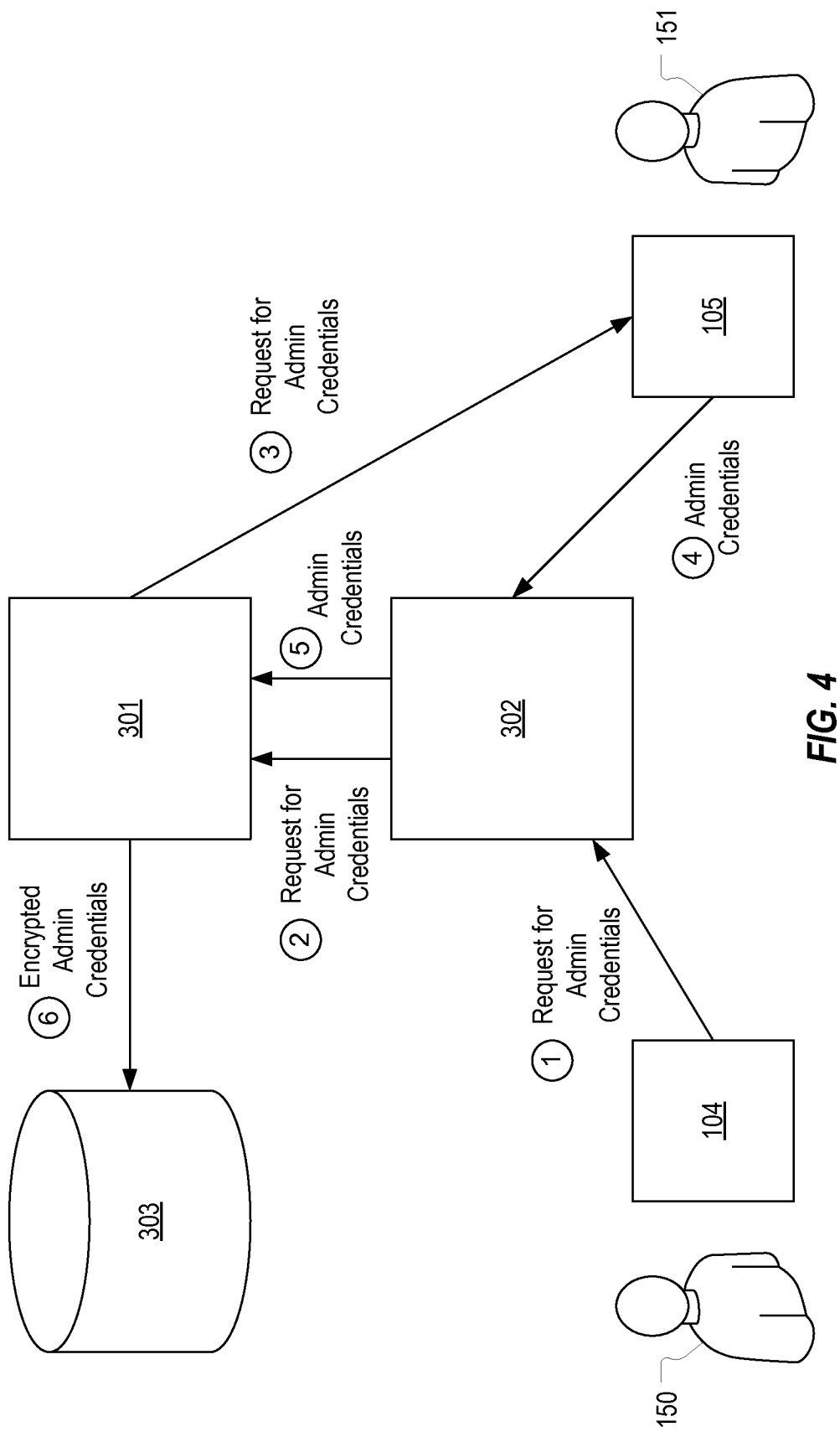
FIG. 4 provides a flowchart depicting how the migration system of FIG. 3 can be employed to provide controlled access to admin credentials during a migration.

FIG. 4 provides a flowchart depicting how admin credentials can be stored in identity database 303 in response to a consultant's request for such credentials. The process depicted in FIG. 4 may be performed prior to a migration to obtain the admin credentials required to later perform particular tasks during the migration. However, the process could also be employed during a migration to configure migration engine 301 to perform a particular task requiring admin credentials.

In step 1, consultant 150 submits a request for admin credentials to web console 302. As an example, consultant 150 could employ a browser on computing device 104 (e.g., a desktop computer, a laptop, a mobile device, etc.) to submit the request to web console 302. However, any suitable means for submitting a request to web console 302 could be employed.

As was stated above, web console 302 could be employed to facilitate interactions with migration engine 301, such as, for example, by providing a web-based interface (or abstraction layer) for such interactions. However, the present invention can equally be implemented when another type of interface, including a direct interface to migration engine 301, is employed to configure migration engine 301.

Regardless of how consultant 150 submits the request for admin credentials, the request can be submitted to migration engine 301. In FIG. 4, because web console 302 is employed, the request is shown as being routed to migration engine 301 in step 2. However, when web console 302 is not employed or is incorporated into migration engine 301, steps 1 and 2 can be merged. Migration engine 301 can be configured to forward this request to an administrator 151 as is shown in step 3. For example, migration engine 301 may generate an email or other communication that includes a secure URL and send the email to administrator 151.

In step 4, administrator 151 inputs the admin credentials and the admin credentials are sent to web console 302. For example, administrator 151 may click on the secure URL within the email which may open a webpage that includes fields for inputting the admin credentials (e.g., username and password). The webpage may be configured to securely submit the admin credentials to web console 302 (e.g., via HTTPS). Of course, other means for securely receiving the admin credentials from administrator 151 may be employed.

In step 5, web console 302 routes the admin credentials to migration engine 301 (e.g., using a secure connection such as an HTTPS connection). As noted above, steps 4 and 5 can be merged in embodiments where web console 302 is not employed or is integrated within migration engine 301.

In step 6, migration engine 301 can encrypt the admin credentials and store them in identity database 303 for use at a later time during the migration. Although not represented in FIG. 4, migration engine 301 can store the admin credentials in association with a unique identifier or other means for retrieving the admin credentials at a later time. This identifier or other means can be employed within the configuration of migration engine 301 as a form of a placeholder for the admin credentials. In this way, consultant 150, who is tasked with configuring migration engine 301, will not need to have access to the admin credentials. Also, because the admin credentials are stored in an encrypted format, there is less risk that the admin credentials can be compromised while stored within identity database 303.

The process depicted in FIG. 4 can be repeated as necessary to obtain each set of admin credentials that are required during a migration. For example, the process can be completed a first time to obtain the admin credentials for accessing the source system and can then be completed a second time to obtain the admin credentials for accessing the target system. In each case, migration engine 301 can employ an identifier or other means to associate the appropriate admin credentials with the task that requires them.

In some embodiments, the ability to request admin credentials is directly provided by migration engine 301 (or web console 302). For example, while consultant 150 is configuring migration engine 301 (e.g., via interfaces provided by web console 302), migration engine 301 may be configured to allow consultant 150 to submit a request for admin credentials that can be associated with a particular portion of the configuration settings such as the portion of the configuration settings for accessing the source system or the portion of the configuration settings for accessing the target system. For example, migration engine 301 (e.g., via web console 302) may provide a wizard or other interface that guides consultant 150 through the configuration process such as by soliciting the required information to create appropriate connections with each of the source and target systems as well as to specify which content is to be migrated and how the content is to be migrated. As part of this process, migration engine 301 can display an option for consultant 150 to request the appropriate admin credentials.

In one example, a first set of admin credentials will be required to access the source system while a second set of admin credentials will be required to access the target system. However, in other examples, more than one set of admin credentials may be required to access the source or target systems. For example, one set of admin credentials may be required to login to a source system while a different set of admin credentials may be required to access a particular resource on the source system.

In any case, migration engine 301 can employ appropriate identifiers or other means for distinguishing between sets of admin credentials to ensure that, during the migration, migration engine 301 can retrieve the appropriate admin credentials from identity database 303 to perform a particular task. For example, admin credentials for accessing the source system can be stored with an appropriate identifier indicating that the credentials correspond to the source system.

Figure 5:
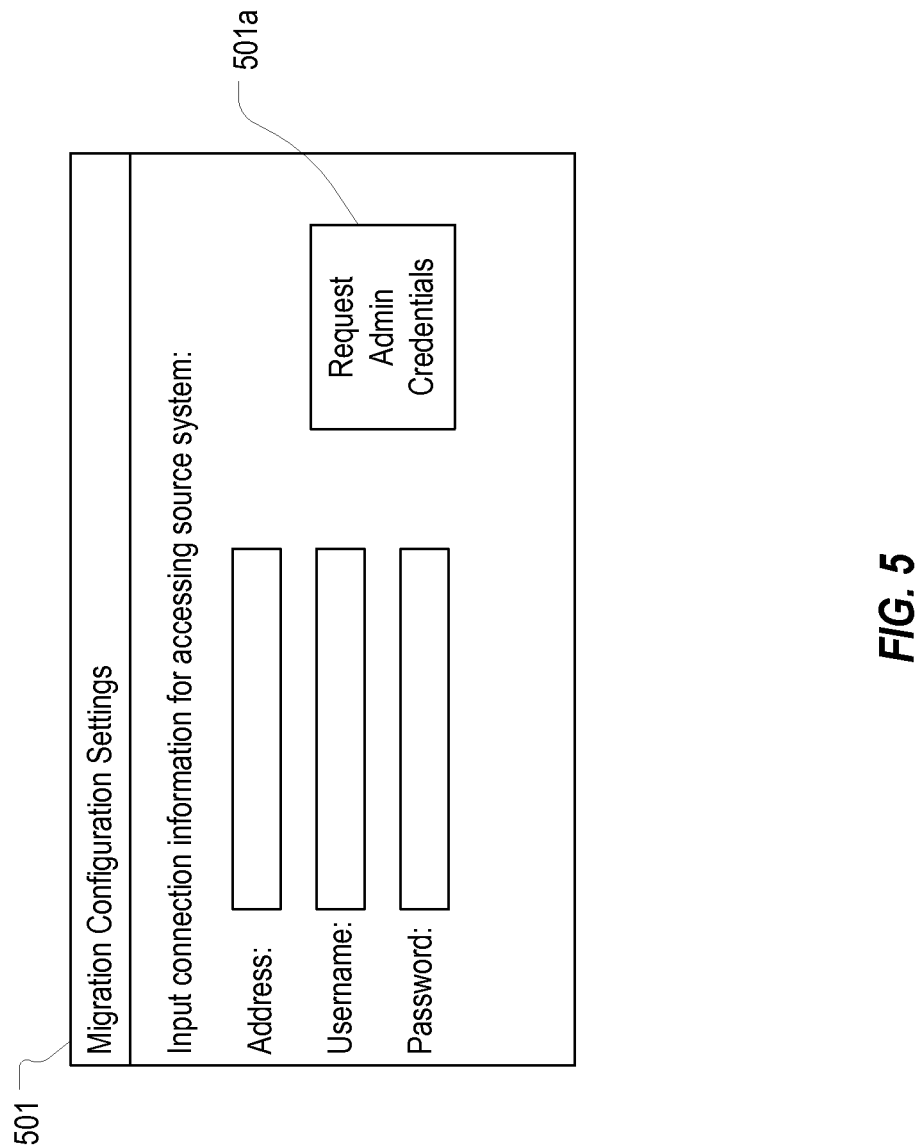
FIG. 5 illustrates an example interface that can be provided to allow a consultant to request admin credentials.

FIG. 5 illustrates a generalized example of an interface 501 that can be displayed to consultant 150 during the process of configuring migration engine 301. As shown, interface 501 is prompting consultant 150 to provide configuration settings for accessing the source system. In this generalized example, these configuration settings include an address where the source system can be accessed and the username and password necessary to access the source system with enhanced privileges. If consultant 150 knows the admin credentials, he could directly enter them into the appropriate fields within interface 501. However, in accordance with embodiments of the present invention, consultant 150 can be enabled to configure migration engine 301 even without knowing the admin credentials. In this example, a button 501a is provided within interface 501 which, when selected, can initiate the process depicted in FIG. 4. In particular, if consultant 150 selects button 501a, a request for admin credentials can be sent to migration engine 301 (e.g., via web console 302) which in turn can generate the appropriate request and send it to consultant 151. Once the admin credentials are received, migration engine 301 can encrypt and store them in identity database 303 and update the configuration settings accordingly to cause the appropriate admin credentials to be retrieved when the corresponding task is to be performed.

Figure 6:
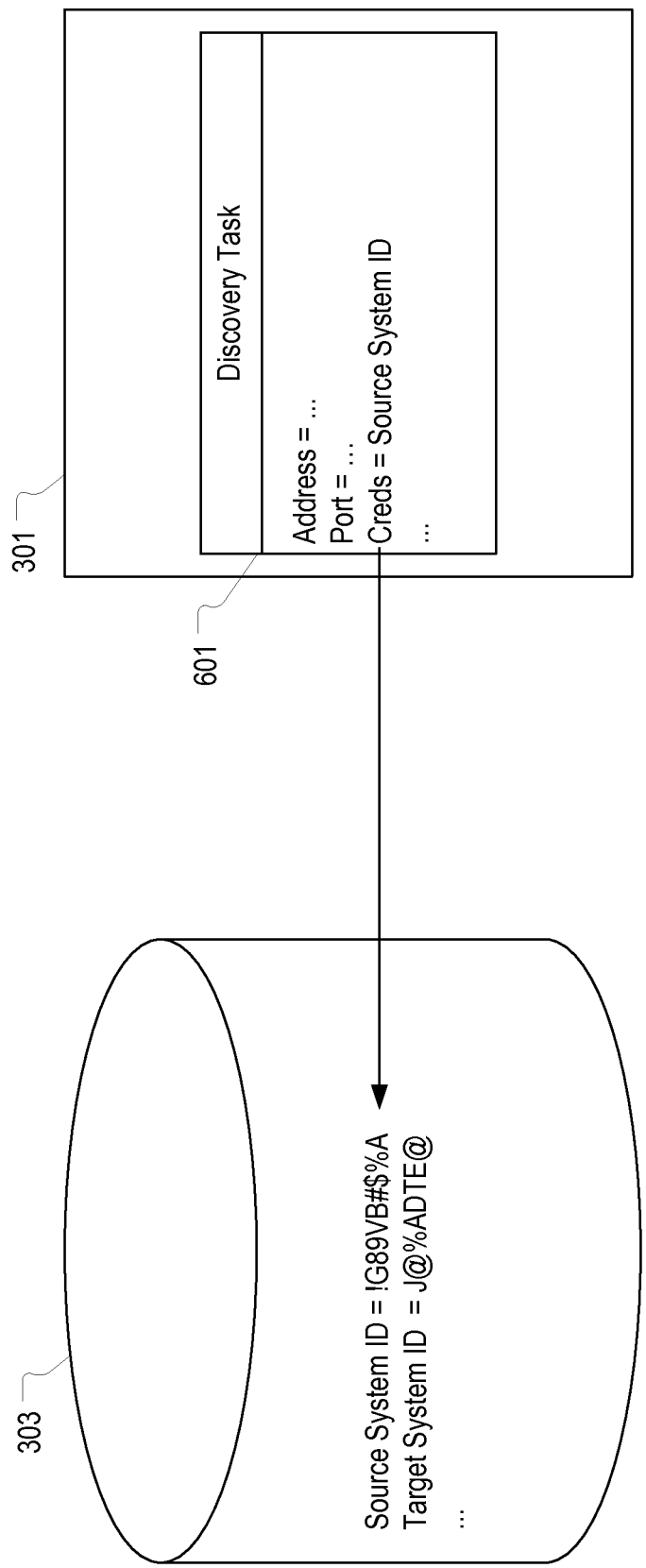
FIG. 6 illustrates an example of how a migration engine can be configured to retrieve the appropriate admin credentials from an identity database when the admin credentials are needed to perform a migration task.

FIG. 6 illustrates an example of how migration engine 301 can be configured to retrieve the appropriate admin credentials from identity database 303 when necessary to perform a migration task. In this example, the migration task is a discovery task 601 that is performed on the source system. It is assumed that consultant 150 has provided appropriate configuration information to configuration engine 301 to allow the discovery task to be performed. For example, consultant 150 has previously specified an address for the source system, a port to use to access the source system, and has requested admin credentials in accordance with the process of FIG. 4.

Because the admin credentials were requested, an encrypted copy of the admin credentials required to access the source system are stored in identity database 303. As shown, the admin credentials can be stored in association with an appropriate identifier that indicates to which system (or possibly to which resource) the admin credentials correspond. During migration, when migration engine 301 commences the discovery task, migration engine 301 can use the associated identifier to retrieve the admin credentials from identity database 303. It is noted that FIG. 6 is intended merely as an example of how migration engine 301 can be configured to retrieve the appropriate admin credentials for a particular task and any other suitable manner for associating admin credentials with a corresponding task can be employed. It is also noted that some migration tasks may require the admin credentials for both the source and target systems.

In some embodiments, when requesting admin credentials (i.e., in step 1 of FIG. 4), consultant 150 can specify an address or other identifier of an administrator to whom the request should be sent. For example, with reference to FIG. 5, when button 501a is selected, consultant 150 may be prompted to input an email address or name of the appropriate administrator (i.e., one that knows the appropriate admin credentials and is authorized to provide them to migration engine 301). In some migrations, there may be different administrators that know the different sets of admin credentials that are required to perform the migration. For example, one administrator may know the admin credentials for the source system while another administrator may know the admin credentials for the target system. Accordingly, the address or other identifier provided by consultant 150 with a request can be used by migration engine 301 to create and send the corresponding request for admin credentials to the appropriate administrator. In other embodiments, however, migration engine 301 may be configured to send a request to a predefined administrator. In such cases, the administrator may be predefined based on the type of admin credentials being requested.

In some embodiments, the request for admin credentials that is sent to the administrator (e.g., the request sent in step 3 of FIG. 4) can include a reason for the request. The reason can specify what type of access the admin credentials will be used to perform. By including a reason for the request, the administrator can more properly evaluate whether the admin credentials should be provided. In some embodiments, the reason for the request can be specified by consultant 150. However, in other embodiments, the reason can be specified by migration engine 301. In such cases, migration engine 301 can define the reason based on the configuration settings with which the admin credentials are to be associated (e.g., based on the particular task that is to be performed using the requested admin credentials). For example, if consultant 150 is requesting the admin credentials in conjunction with configuring migration engine 301 to login to the source system, migration engine 301 can send a request to administrator 151 that specifies that consultant 150 desires the admin credentials for logging into the source system. Similarly, if consultant 150 is requesting the admin credentials for updating a directory structure on the target system, the request can include a corresponding indication.

In some embodiments, migration engine 301 can be configured to perform a process to obtain approval for a particular task that is similar to the process used to obtain admin credentials. For example, some organizations may desire to have additional control over when particular migration tasks are performed. Such tasks may require the use of admin credentials which can be obtained in the manner described above. In addition, even after migration engine 301 is configured to employ admin credentials to perform a scheduled task, migration engine 301 can also be configured to perform an approval process prior to initiating the scheduled task. Similarly, this approval process can be performed when consultant 150 attempts to schedule a task in order to obtain approval of the schedule.

Figure 7:
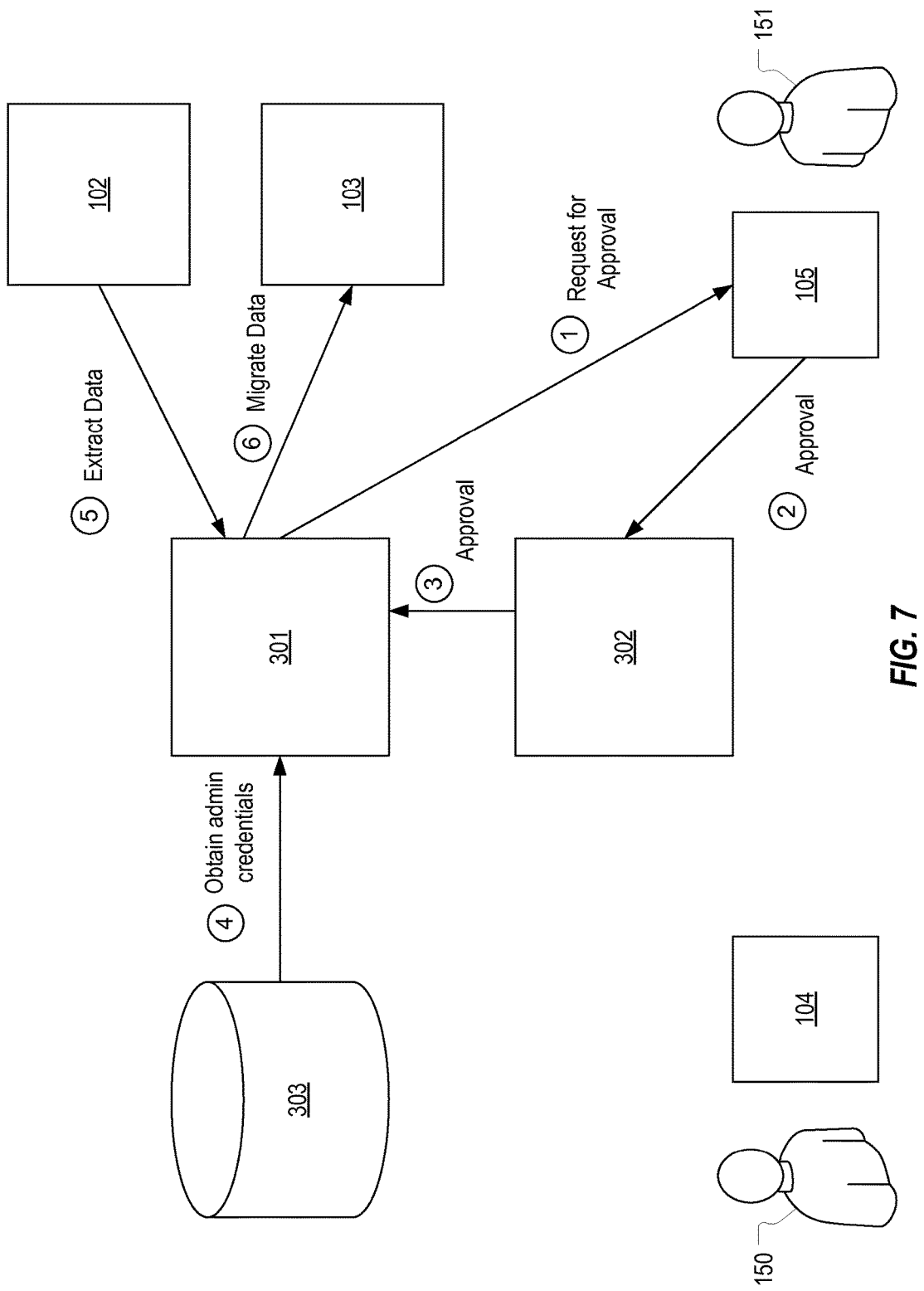
FIG. 7 illustrates a flowchart depicting how the migration system of FIG. 3 can be employed to obtain administrator approval to perform a migration task.

FIG. 7 provides an example of how this approval process can be performed to receive an administrator's approval before a scheduled task is initiated. It will be assumed that prior to performing this approval process, the process depicted in FIG. 4 has been performed one or more times such that the admin credentials necessary for performing the scheduled task are stored in identity database 303. It is also assumed that consultant 150 has already configured migration engine 301 to perform the scheduled task, and therefore consultant 150 is not shown as being involved during the approval process.

Initially, as migration engine 301 prepares to perform the scheduled task, it can be determined that approval is required prior to commencing the scheduled task (e.g., by detecting a configuration setting that specifies that administrator approval is required). Accordingly, in step 1, migration engine 301 sends a request to administrator 151 for approval to perform the scheduled task. This request can describe the scheduled task to allow the administrator to make an informed decision on whether to provide approval. As described above, this request for approval can be in the form of an email or other communication that contains a URL for opening a webpage or other interface for receiving input of the requested approval.

Step 2 illustrates that administrator 151 has provided approval. In this example, it is assumed that a webpage which causes the approval to be submitted to web console 302 is employed. In such cases, web console 302 can be configured to route the approval to migration engine 301 in step 3.

Once migration engine 301 has received the approval, the scheduled task can be performed which is represented by steps 4-6. In step 4, migration engine 301 retrieves the appropriate admin credentials from identity database 303 and employs them to extract data from source system 102 in step 5 and to migrate the extracted data to target system 103 in step 6. This approval process can be performed any time migration engine 301 is configured to perform a task for which approval is required.

As noted above, this approval process can also be performed to allow a consultant to obtain approval of a scheduled task. For example, consultant 150 may configure migration engine 301 to perform a particular task at a particular time. In practice, this particular time is oftentimes after hours when administrators may not be available to provide approval immediately before the scheduled time. In such cases, migration engine 301 can provide an option for consultant 150 to submit a request for approval in a similar manner as admin credentials are requested. In such cases, the approval process depicted in FIG. 7 would be substantially the same with the inclusion of the initial steps of consultant 150 making the request for approval. Also, in such cases, once approval is received for the scheduled task, migration engine 301 can perform the scheduled task at the scheduled time without needing to obtain further approval.

Both the process for obtaining admin credentials and the process for receiving approval for a particular task can require input from more than one administrator. For example, the process of FIG. 4 could include an additional step of requesting another administrator's approval to provide the admin credentials to migration engine. Similarly, the process of FIG. 7 could include an additional step of requesting another administrator's approval to perform the scheduled task. The number of administrators that are required to approve the use of credentials and/or the performance of a task can vary based on the type of credentials and/or the type of task. In such cases, migration engine 301 can be configured to generate the appropriate number of requests for administrator input.

In some embodiments, the processes of FIGS. 4 and 7 could be combined into a single process. For example, the request for admin credentials could also include a request for approval to perform a particular task with the admin credentials. As an example, with reference to FIG. 4, the request of step 3 could include a proposed schedule for performing one or more tasks that require the requested admin credentials. In such cases, the administrator (or administrators) can receive a request to provide admin credentials and to approve the proposed schedule.

Figure 8:
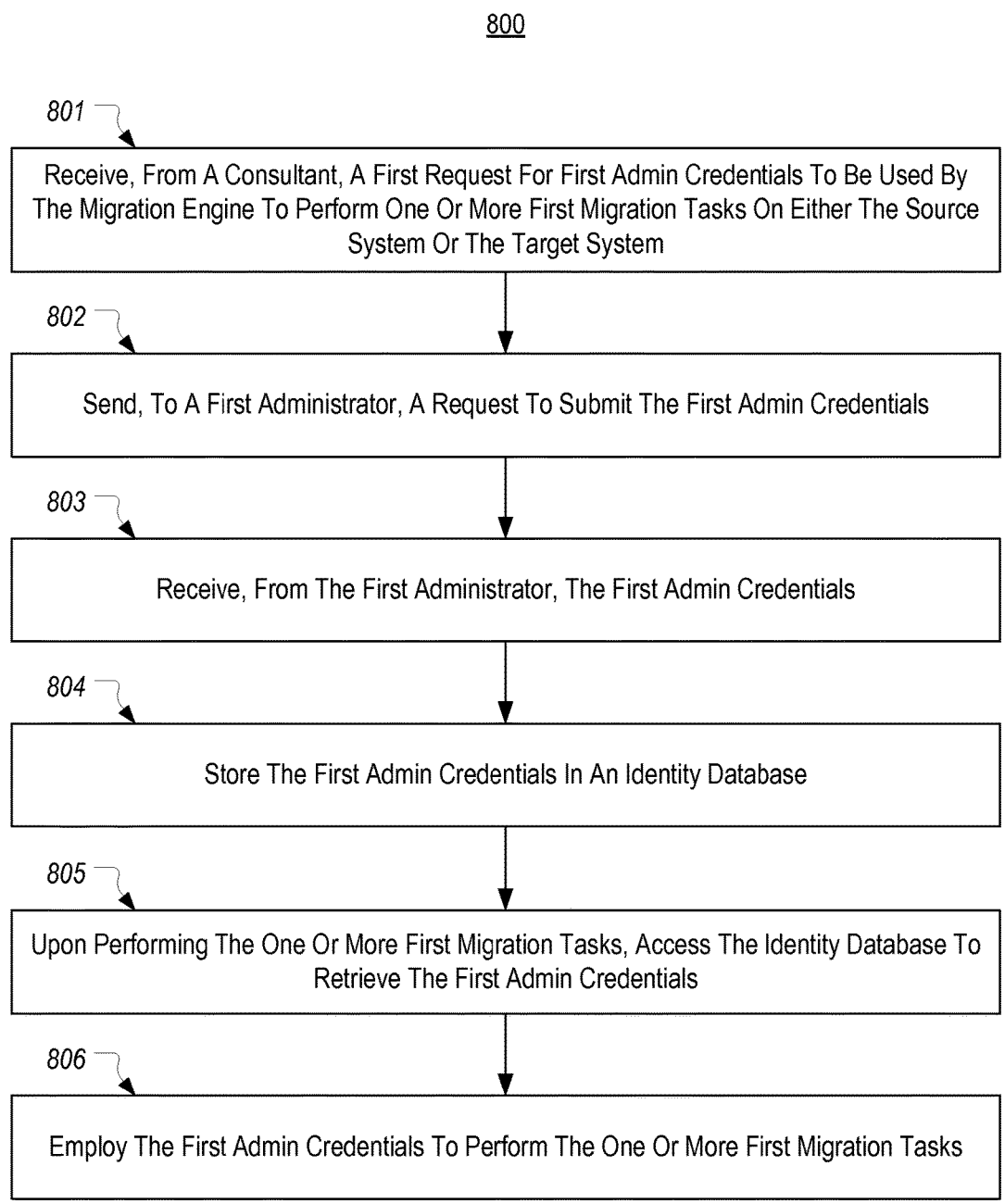
FIG. 8 illustrates a flowchart of an example method for providing controlled access to admin credentials during a migration.

FIG. 8 provides a flowchart of an example method 800 for providing controlled access to admin credentials during a migration. Method 800 can be implemented by a migration engine that is interposed between a source system and a target system to perform a migration of content from the source system to the target system. Method 800 will be described primarily with reference to FIG. 4.

Method 800 includes an act 801 of receiving, from a consultant, a first request for first admin credentials that are required by the migration engine to perform one or more migration tasks on either the source system or the target system. For example, migration engine 301 can receive a request from consultant 150 as shown in steps 1 and 2.

Method 800 includes an act 802 of sending, to a first administrator, a request to submit the first admin credentials. For example, migration engine 301 can send a request to administrator 151 as shown in step 3.

Method 800 includes an act 803 of receiving, from the first administrator, the first admin credentials. For example, migration engine 301 can receive admin credentials from administrator 151 as shown in steps 4 and 5.

Method 800 includes an act 804 of storing the first admin credentials in an identity database. For example, migration engine 301 can store the admin credentials in identity database 303 as shown in step 6.

Method 800 includes an act 805 of, upon performing the one or more migration tasks, accessing the identity database to retrieve the first admin credentials. For example, when migration engine 301 attempts to perform a migration task requiring admin credentials, migration engine 301 can access the appropriate credentials within identity database 303.

Method 800 includes an act 806 of employing the first admin credentials to perform the one or more migration tasks. For example, migration engine 301 can employ the admin credentials to access a source system and/or a target system.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a migration engine that is interposed between a source system and a target system to perform a migration of content from the source system to the target system, for providing controlled access to admin credentials during the migration, the method comprising:
receiving, from a consultant, a first request for first admin credentials that are required by the migration engine to perform one or more migration tasks on the source system, wherein the first admin credentials are required by the migration engine to perform the one or more migration tasks on the source system;
sending, to a first administrator, a request to submit the first admin credentials;
receiving, from the first administrator, the first admin credentials;
storing the first admin credentials in an identity database in association with a first identifier that indicates that the first admin credentials correspond to the source system;
receiving, from the consultant, a second request for second admin credentials that are required by the migration engine to perform one or more migration tasks on the target system;
sending, to a second administrator, a request to submit the second admin credentials;
receiving, from the second administrator, the second admin credentials;
storing the second admin credentials in the identity database in association with a second identifier that indicates that the second admin credentials correspond to the target system;
upon performing the one or more migration tasks on the source system, accessing the identity database to retrieve the first admin credentials;
employing the first admin credentials to perform the one or more migration tasks on the source system;
upon performing the one or more migration tasks on the target system, accessing the identity database to retrieve the second admin credentials; and
employing the second admin credentials to perform the one or more migration tasks on the target system.

2. The method of claim 1, wherein the first request and the second request are one of the same request or different requests.

3. The method of claim 1, wherein the request to submit the first admin credentials and the request to submit the second admin credentials are one of the same request or different requests.

4. The method of claim 1, wherein the first admin credentials and the second admin credentials are one of the same admin credentials or different admin credentials.

5. The method of claim 1, wherein the first and second administrators are one of the same administrator or different administrators.

6. The method of claim 1, wherein the first request includes an identifier of the first administrator.

7. The method of claim 1, wherein the first request is received from the consultant via a web console.

8. The method of claim 1, wherein the request to submit the first admin credentials comprises a communication that includes a link to an interface within which the first admin credentials can be input.

9. The method of claim 1, further comprising:
prior to performing at least one of the one or more migration tasks on the source system or at least one of the one or more tasks on the target system, sending, to one or more administrators, a request to provide approval to perform the at least one of the one or more migration tasks on the source system or the at least one of the one or more migration tasks on the target system; and
receiving the approval;
wherein, the first or second admin credentials are not employed to schedule or perform any migration tasks until approval is received.

10. The method of claim 9, wherein the request to provide approval is sent in response to detecting that the at least one of the one or more migration tasks on the source system or the at least one of the one or more migration tasks on the target system require approval.

11. The method of claim 9, wherein the request to provide approval is sent in response to the first request or the second request.

12. The method of claim 1, wherein the request to submit the first or second admin credentials includes a request to provide approval of a proposed schedule for performing at least one of the one or more migration tasks on the source system or at least one of the one or more migration tasks on the target system, the method further comprising:
receiving, from the first or second administrator, the approval of the proposed schedule.

13. One or more non-transitory computer storage media storing computer executable instructions which when executed perform a method for providing controlled access to admin credentials during a migration, the method comprising:
displaying, to a consultant, one or more interfaces configured to receive configuration settings for configuring the migration engine to perform one or more migration tasks on one or both of a source system and a target system;
receiving, from the consultant and via the one or more interfaces, a first request for admin credentials corresponding to the source system;
in response to the first request, sending, to an administrator, a request to submit the admin credentials corresponding to the source system;
receiving, from the consultant and via the one or more interfaces, a second request for admin credentials corresponding to the target system;
in response to the second request, sending, to the administrator, a request to submit the admin credentials corresponding to the target system;
receiving, from the administrator, the admin credentials corresponding to the source system and the admin credentials corresponding to the target system;
storing, in an identity database, the admin credentials corresponding to the source system in association with an identifier of the source system and the admin credentials corresponding to the target system in association with an identifier of the target system;
upon performing a first migration task of the one or more migration tasks that requires accessing either or both the source or target systems, retrieving the corresponding admin credentials from the identity database; and
employing the corresponding admin credentials to perform the first migration task.

14. The computer storage media of claim 13, wherein the first and second requests are one of the same request or different requests, and wherein the request to submit the admin credentials corresponding to the source system and the request to submit the admin credentials corresponding to the source system are one of the same request or different requests.

15. The computer storage media of claim 13, wherein the first migration task employs both the admin credentials corresponding to the source system and the admin credentials corresponding to the target system.

16. The computer storage media of claim 13, further comprising:
   prior to performing the first migration task, sending, to the administrator, a request for approval to perform the first migration task;
   receiving, from the administrator, the approval to perform the first migration task; and
   wherein the corresponding admin credentials are retrieved and employed to perform the first migration task in response to receiving the approval.

17. A migration system comprising one or more hardware processors and one or more computer storage media storing computer executable instructions which when executed by the one or more hardware processors implement:
   a migration engine configured to be interposed between a source system and a target system to perform a migration of content from the source system to the target system; and
   an identity database for storing first admin credentials corresponding to the source system and second admin credentials corresponding to the target system;
   wherein the migration engine is configured to receive input from a consultant that configures the migration engine to perform one or more migration tasks during the migration of content from the source system to the target system, and wherein at least one of the one or more migration tasks requires one or both of the first admin credentials or the second admin credentials; and
   wherein the migration engine is further configured to receive one or more requests from the consultant for the first admin credentials and the second admin credentials, and in response, send one or more requests to one or more administrators for the first admin credentials and the second admin credentials such that, upon receiving the first and second admin credentials, the migration engine stores the first and second admin credentials in the identity database for subsequent retrieval when performing the at least one of the one or more migration tasks thereby enabling the migration engine to perform the at least one of the one or more migration tasks without receiving the first or second admin credentials from the consultant.

18. The migration system of claim 17, wherein the migration engine is further configured to send a request to the one or more administrators for approval to perform the at least one of the one or more migration tasks, and to perform the at least one of the one or more migration tasks only after receiving the approval.

* * * * *